United States Patent
Vingralek

(10) Patent No.: US 7,565,575 B2
(45) Date of Patent: Jul. 21, 2009

(54) SELECTING OPTIMAL REPAIR STRATEGY FOR MIRRORED FILES

(75) Inventor: Radek Vingralek, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 504 days.

(21) Appl. No.: 11/516,068

(22) Filed: Sep. 5, 2006

(65) Prior Publication Data

US 2008/0010507 A1     Jan. 10, 2008

Related U.S. Application Data

(60) Provisional application No. 60/810,075, filed on May 30, 2006, provisional application No. 60/810,076, filed on May 30, 2006.

(51) Int. Cl.
*G06F 11/00* (2006.01)

(52) U.S. Cl. .............................................. 714/7; 714/5

(58) Field of Classification Search ................. 714/5–7, 714/11–13, 42, 54; 711/114, 170
See application file for complete search history.

(56) References Cited

U.S. PATENT DOCUMENTS

| | | | |
|---|---|---|---|
| 5,720,025 A | | 2/1998 | Wilkes et al. |
| 6,101,576 A | * | 8/2000 | Kobayashi et al. .......... 711/122 |
| 6,928,521 B1 | * | 8/2005 | Burton et al. ................ 711/144 |
| 6,959,413 B2 | * | 10/2005 | Humlicek et al. ............ 714/807 |
| 7,085,953 B1 | * | 8/2006 | Hsu et al. ....................... 714/5 |
| 7,152,165 B1 | | 12/2006 | Maheshwari et al. |
| 7,360,018 B2 | * | 4/2008 | Higashijima et al. ......... 711/114 |
| 2002/0124139 A1 | | 9/2002 | Baek et al. |
| 2003/0056142 A1 | | 3/2003 | Hashemi |
| 2003/0126523 A1 | | 7/2003 | Corbett et al. |
| 2006/0271547 A1 | | 11/2006 | Chen et al. |

OTHER PUBLICATIONS

U.S. Appl. No. 11/516,299, Office Action dated Dec. 12, 2008, 14 pgs.

* cited by examiner

*Primary Examiner*—Dieu-Minh Le
(74) *Attorney, Agent, or Firm*—Townsend and Townsend and Crew LLP

(57) ABSTRACT

This document describes solutions to reduce the time of reduced data redundancy following transient disk failures that do not corrupt the disk. Beneficially, these solutions provide a way to estimate the most efficient repair strategy for the disk group, which helps to minimize the amount of time data in a disk group remains unprotected. Merely by way of example, a threshold value might specify a duration in which a disk failure should be considered transient, such that if the disk is repaired within that duration, only the stale extents on the disk need be recreated. If the disk cannot be repaired within that duration, the entire contents of the disk might be recreated on one or more other disks in the group.

16 Claims, 6 Drawing Sheets

SELECTING OPTIMAL REPAIR STRATEGY FOR MIRRORED FILES

CROSS-REFERENCE TO RELATED APPLICATIONS

The present disclosure may be related to the following commonly assigned applications/patents:

This application claims the benefit of provisional U.S. Patent Application No. 60/810,076, filed May 30, 2006 by Vingrelek and entitled "Estimating Data Availability on Managed Storage Devices," the entire disclosure of which is hereby incorporated by reference, as if set forth in full in this document, for all purposes.

This application claims the benefit of provisional U.S. Patent Application No. 60/810,075, filed May 30, 2006 by Vingrelek and entitled "Selecting Optimal Repair Strategy for Mirrored Files," the entire disclosure of which is hereby incorporated by reference, as if set forth in full in this document, for all purposes.

This application is related to co-pending U.S. patent application Ser. No. 11/516,299, filed on Sep. 5, 2006 by Vingralek and entitled "Estimating Data Availability on Managed Storage Devices", the entire disclosure of which is hereby incorporated by reference, as if set forth in full in this document, for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to data storage devices, and more particularly to methods, systems and software for repairing data lost when a storage device fails.

BACKGROUND OF THE INVENTION

Given the importance of data commonly stored on computers, several strategies have been developed to provide redundancy and prevent data loss in the case of a disk failure. Merely by way of example, many computers feature a redundant array of inexpensive disks ("RAID") in order to provide mirroring capabilities, as well as, in some cases, enhance drive performance. A mirrored file generally is replicated on at least two different disks. When one of those disks fails, the mirrored file can be repaired in one of two ways: either the system triggers a repair by re-creating the lost data blocks from their redundant copies on the remaining disks in the system, or the system waits for an administrator to repair the failing disk, for example, by reconnecting a cable to the disk, etc.) and re-synchronizing stale blocks (i.e., blocks updated while the disk was not available) on the previously failed disk.

Each of these two common methods provides relative benefits and drawbacks. The first method surge to restore data redundancy immediately, but it is computationally expensive, because the entire content of the failed disk must be re-created. Consequently, data blocks remain unprotected for a relatively long period of time. On the other hand, the second method is faster, because only stale blocks must be copied, but leaves data blocks unprotected (i.e., not mirrored) while waiting for repair of the transient failure. Moreover, if a failure is not a transient failure (i.e., the disk must be replaced), the first repair method must be performed in any event, and performing the second method in the first instance merely prolongs the delay.

BRIEF SUMMARY OF THE INVENTION

In a set of embodiments, the invention provides solutions to reduce the time of disk group repair following transient disk failures that do not corrupt the disk. Beneficially, these solutions provide a way to estimate the most efficient repair strategy, which helps to minimize the amount of time data in a disk group remains unprotected. Merely by way of example, a threshold value might specify a duration in which a disk failure should be considered transient, such that if the disk is repaired within that duration, only the stale extents on the disk need be recreated. If the disk cannot be repaired within that duration, the entire contents of the disk might be recreated on one or more other disks in the group.

Various embodiments of the invention provide, inter alia, methods, systems and software products. In some embodiments of the invention, a system (such as a computer system) might be configured to implement a method of the invention. Merely by way of example, the system might comprise, inter alia, one or more processors, along with instructions (which might be stored on a disk and/or other computer readable medium) executable by the processors to perform the method. In other embodiments, a software product might embody the method, for example as a set of instructions (which again, might be stored on a disk and/or other computer readable medium), which are executable by one or more computers to execute the method.

Merely by way of example, in accordance with a set of embodiments, a method of repairing a disk group (which comprises a plurality of hard disks) might comprise determining a threshold value for a repair time of the disk group. In some cases, the threshold value might represent a duration during which the hard disk failure should be assumed to be transient. This threshold value can be determined in many ways. Merely by way of example, in one embodiment, determining the threshold value might comprise estimating a mean repair time for a transient failure of a hard disk in the disk group and/or calculating the threshold value based on the estimated mean repair time. In other embodiments, a user might be allowed to specify the threshold value.

The method might further comprise maintaining a set of metadata for each hard disk in the disk group. Merely by way of example, in one embodiment, each hard disk stores a set of data blocks, each of which comprises a set of data stored on the hard disk. The set of metadata for a hard disk, then, might comprise information about whether each of the data blocks on the hard disk is current. (The metadata about the data blocks on a particular disk might be, but need not be, stored on the disk itself.)

The method, in some cases, further comprises identifying (e.g., with a computer) a first hard disk in the disk group that has become unavailable (if, for example, the disk has failed, either transiently or permanently). The first hard disk might comprise a first set of data blocks, and the method might further comprise marking as stale (e.g., in the set of metadata for the first hard disk), each data block on the first hard disk to which a write attempt is made while the offline disk is unavailable. In some embodiments, the method further comprises repairing the disk group.

Repairing the disk group can take a variety of forms, in accordance with various embodiments. Merely by way of example, in some embodiments, if the first hard disk becomes available before the duration specified by the threshold value has expired, repairing the disk group might comprise re-creating each of the data blocks marked as stale in the metadata for the first hard disk. Alternatively and/or additionally, if the first hard disk does not become available before the duration specified by the threshold value has expired, repairing the disk group might comprise re-creating the first set of data blocks on one or more additional hard disks in the disk group.

Another set of embodiments provides systems for repairing a disk group. In some exemplary embodiment, the system comprises one or more processors, along with a set of instructions executable by the processor(s) to perform methods of the invention. In particular embodiments, the system might further comprise a disk group, which might include a plurality of hard disks, each of which is in communication with the processor(s). The disk group might comprise a RAID array.

Yet another set of embodiments provides software programs, including without limitation software programs for configuring and/or repairing disk groups. An exemplary software program might be embodied on a computer readable medium and/or might comprise a set of instruction that are executable by one or more computers to perform methods of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

1. Overview

One set of embodiments provides systems, methods and/or software products for repairing a disk group. Advantageously, certain embodiments are configured to select estimate, from among two or more alternatives, an optimal repair strategy for a disk group having a failed disk. Merely by way of example, if a disk permanently fails, the optimal repair strategy often is to copy the data that was on the failed disk to another disk (i.e., recreate the disk). (It is assumed in this scenario, that a copy of each data block was stored on at least one other disk in the group prior to the failure.) On the other hand, if a disk failure is known to be transient, it often will be better to wait for the failure to be remedied, and write to the disk any data that should have been written while the disk was unavailable, as opposed to recreating the disk, which generally is a much more intensive operation, taking significantly longer to complete. Between these two strategies, and others, embodiments of the invention provide a way to estimate the optimal repair strategy, thereby minimizing the time that data is unprotected.

Figure 1:
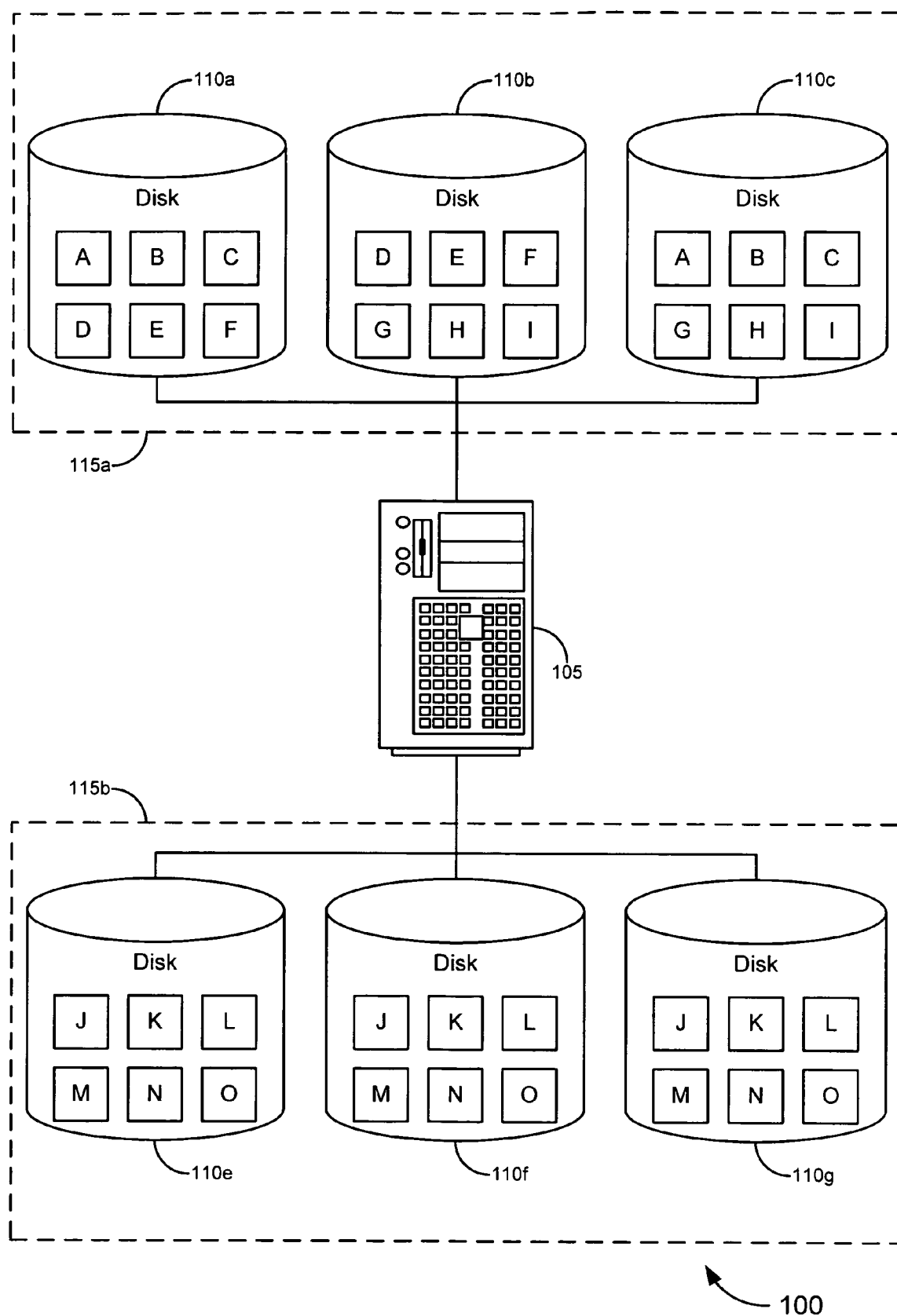
FIG. 1 is a block diagram illustrating a computer system having two disk groups, in accordance with various embodiments of the invention.

Consider, for the example, the system 100 of FIG. 1. The system 100 includes a computer 100 (which might be a server, such as, for example, those described with respect to FIG. 6, below, and/or might be any other appropriate computer) and a plurality of hard disks 110. (While, for ease of description, this document uses the term "hard disk" to refer to non-volatile storage, the term should be construed broadly to mean any storage medium that provides read and write access, including, merely by way of example, flash RAM and/or ROM, removable storage devices, etc.).

The disks 110 are arranged into disk groups 115. As defined herein, a "disk group" is any logical arrangement of disks to provide collective storage of information. There are a wide variety of ways in which disk groups can be implemented and/or organized. Merely by way of example, a disk group might be a redundant array of independent disks ("RAID"), which often is implemented via a hardware controller and/or a specific software application on the controlling computer. One skilled in the art will appreciate that there are several structures into which RAIDS are commonly organized. Merely by way of example RAID level 0 provides a data striping arrangement, in which data is striped across multiple disks in order to improve performance of the array, but provides no fault tolerance. RAID level 1 provides disk mirroring, in which the contents of one drive are mirrored on another drive. Another common arrangement, RAID level 5, provides data striping across independent disks with distributed parity blocks, while RAID level 6 provides data striping with dual parity systems, for enhanced fault tolerance. Other RAID arrangements are common as well.

As an alternative, or addition, to RAID, some software applications are configured to create and/or manage disk groups as well. Merely by way of example, Oracle Corporation's Automatic Storage Management™ (ASM) package, which is available with the Oracle 10g™ database management system, provides disk group management via a software application. In this context, each disk 110 can be considered to include either a single disk or a multi-disk array, such as a RAID system—that is, the software package, such as ASM or the like, might be configured to treat a RAID system as a single disk when configuring a disk group, such that a single group 115 might comprise multiple RAID systems, each acting logically as a single disk. Other systems and methods of creating and/or managing disk groups are possible as well.

As noted above, there are various possible arrangements of disks 110 (or RAID systems) in a group 115. Merely by way of example, the disk group 115a comprises three disks 110a-c and provides data redundancy among those disks. For instance, one disk 110a stores data blocks A-F, while another disk 110b stores data blocks D-I and a third disk 110c stores data blocks A-C and G-I. It should be noted that a given data block with the same label (such as data block A) stored on two different disks comprises identical copies of the same information. Hence, if a disk 110a fails, the data blocks A-F stored on that disk 110a can be recreated from their copies on the other disks 110b-c in the group. (It should be noted that FIG. 1 is greatly simplified, for ease of description and illustration). The term "extent" is used herein to describe a data block; more specifically, the term "virtual extent" is used to describe a data block that is stored on two or more disks in a group, while the term "physical extent" refers to each individual copy of that data. Hence, if a virtual extent is stored on disks $d_1$ and $d_2$, there is a first physical extent on disk $d_1$ holding that data and a second physical extent on disk $d_2$ holding a copy of the same data.

The disk group 115b of FIG. 1 provides an illustration of a highly-redundant configuration, in which each disk 110e-g stores the same data blocks (J-Q). Hence, in the disk group 115b, each data block on a particular disk 110e has identical copies on two other disks 110f and 110g. (It should be noted that, for simplicity, each disk 110e-g is shown as holding each data block J-Q, but that this need not necessarily be the case. For example, if the group 115b had more than three disks, blocks J-Q could be distributed among the disks in any fashion, so long as at least three physical extents, on three different disks, existed for each data block, to preserve high redundancy.) As noted above, other arrangements (such as striping and/or striping with parity) are possible as well, although not illustrated on FIG. 1.

In accordance with an embodiment of the invention, each disk 110 also stores a set of metadata about the data blocks. The metadata includes, without limitation, information about whether a given data block on a particular disk is current or stale. To illustrate this concept, consider what happens when a block needs to be written to a disk. If the disk is available, the block is written and the metadata for that block is marked as current. If the disk is unavailable or the data otherwise cannot be written, however (e.g., through a disk failure, write error, etc.), the data block is marked as stale in the metadata, indicating that the data block was not successfully written to the disk.

In operation, then, an embodiment of the system 100 might be configured to "offline" (e.g., mark as unavailable) a disk whenever the system is unable to complete a write to an extent (data block) allocated to the disk, while writing at least one mirror copy of the same extent (to another disk).

In some cases, upon the expiration of a specified timeout duration after a disk 110a is offlined, the system 100 drops it from the disk group 115a by re-creating the extents A-F allocated to the disk 110a on the remaining disks in the disk group using redundant extent copies from the other disks 110b-c. The process of restoring the original redundancy of all extents in a disk group is referred to herein as re-creating the disk. Since all extents allocated to the failed disk must be re-created from their redundant copies, this method of disk group repair using disk drop is a relatively costly operation, which may take hours to complete.

The high cost incurred by a disk group repair based on disk drop is unnecessary, however, if the disk failure is transient and the disk can be quickly repaired without losing any of the data stored on the disk (such as restoring connectivity to a disk or an entire failure group). The costly disk-recreation operation can be avoided if there are no stale extents on the offlined disk(s). This can be accomplished by relocating any written extents from an offline disk to another online disk, which is termed "strict mirroring semantics." Alternatively, the system can allow writes to extents allocated to an offline disk ("non-strict mirroring semantics"), but mark such extents as stale. (As used herein, the term "offline disk" is used to refer to any disk that is unavailable for write operations. A typical example of an offline disk is a disk that has failed, although a disk could be placed in offline status for other reasons as well.) Following a repair of the failed disk, the disk group will be repaired by a process referred to herein as disk resync, which copies onto the offlined disk new versions of all extents marked as stale and re-creates all physically addressed metadata. Disk resync will repair the disk group in time proportional to the number of extents written since the disk has failed, as opposed to the total number of extents allocated to the disk. Hence, disk resync can be performed, in many cases, much more quickly than disk re-creation.

As noted above, in a set of embodiments, to facilitate the disk resync operation, the system 100 maintains metadata that enumerates all extents (data blocks) updated on a disk after it has been offlined. In some cases, the system 100 might maintain, with each extent, a state indicating whether the content of the extent is stale. When a file is allocated, for example, the state of all extents might be set to current. Once a disk is offlined, the state of a given extent might be set to stale the first time the corresponding extent is written.

2. Analytical Model

Embodiments of the invention, then, provide a way to determine, for a particular disk failure, which repair strategy (such as, for example, disk re-creation or disk resync) should be implemented and at which time (such as, for example, immediately or later, when the system user failed to repair a faulty disk). In one set of embodiments, for example, a threshold duration can be specified to determine which operation should be performed. For the pendency of this threshold duration, the system will attempt to perform a disk resync (if the disk becomes available), and when the threshold duration expires, the system will perform a disk-recreation. If the period of unavailability is shorter than the threshold duration, disk resync will prove to be the least expensive repair operation. On the other hand, if the period of unavailability is longer than the threshold duration, the disk will be re-created. Alternatively, a disk re-creation can be performed immediately upon failure.

In one set of embodiments, an analytical model can be used to estimate an optimal value of the threshold duration, based on the expected time to resync a disk, the expected time to drop (re-create) a disk, and the probability that the failure is transient and can be repaired. (If the failure is not transient, the disk must be dropped and re-created, since the data on the disk cannot be re-synchronized.) In the following model, Let $t_r$ be the expected time to resync a disk, $t_d$ be the expected time to re-create (drop) a disk and $p_t$ be the probability that a disk failure is transient and can be repaired. Let t be a random variable denoting the time to repair a transient failure (e.g., restore connectivity, etc.), with a mean $\bar{t}$. This model assumes that t is exponentially distributed. Finally, the optimal setting of the threshold duration is denoted by $t_{opt}$.

If the disk failure is not transient (with a probability $1-p_t$), the time to recover the disk group is $T=t_{opt}+t_d$. If, on the other hand, the disk failure is transient (with a probability $p_t$), we distinguish two cases: If $t<t_{opt}$, then the time to recover the disk group is $T=t+t_r$. If $t>t_{opt}$, then the time to recover the disk group is $T=t_{opt}+t_d$. Therefore, the expected time to recover the disk group is $$E_{t_{opt}}(T) = (1-p_t)(t_{opt}+t_d) + p_t \left[ \int_0^{t_{opt}} p(t)(t+t_r)\,dt + \int_{t_{opt}}^{+\infty} p(t)\cdot(t_{opt}+t_d)\,dt \right] \quad (1)$$

where $p(t) = e^{-t/\bar{t}}/\bar{t}$ is the probability density function of exponential distribution.

To determine the extremes of $E_{t_{opt}}(T)$, we calculate $$\frac{\partial}{\partial t_{opt}} E_{t_{opt}}(T) = p_t \frac{e^{-t_{opt}/\bar{t}}}{\bar{t}} (t_r + \bar{t} - t_d) + (1 - p_t) \quad (2)$$

and solve $$\frac{\partial}{\partial t_{opt}} E_{t_{opt}}(T) = 0 \quad (3)$$

for $t_{opt}$ as $$t_{opt} = \bar{t} \ln \frac{p_t(t_d - t_r - \bar{t})}{(1 - p_t)\bar{t}} \quad (4)$$

The value of $t_{opt}$ in Equation (4) is a minimum as long as $t_d > \bar{t} + t_r$ because $$\frac{\partial^2}{\partial t_{opt}^2} E_{t_{opt}}(T) = \frac{e^{-t_{opt}/\bar{t}}(t_d - t_r - \bar{t})}{\bar{t}^2} \quad (5)$$

is positive when $t_d > \bar{t} + t_r$.

It turns out that the right hand side of Equation (5) is relatively insensitive to the values of $$\frac{p_t(t_d - t_r - \bar{t})}{(1 - p_t)\bar{t}},$$

since $t_{opt}$ depends only on its logarithm. In particular, if it is assumed that $p_t \in [0.1, 0.9]$ and $$\frac{(t_d - t_r - \bar{t})}{\bar{t}} \in [0.1, 100],$$

the logarithmic factor in Equation (5) can be replaced with its average over the two intervals:

$$t_{opt} = 3.6\bar{t} \quad (6)$$

where $$3.6 \approx \frac{\int_{0.1}^{100} \int_{0.1}^{0.9} \ln \frac{xy}{1-x} dx dy}{(100 - 0.1)(0.9 - 0.1)} \quad (7)$$

Hence, for example, according to the analytical model of this embodiment, if the mean expected time to repair a transient failure ($\bar{t}$) is 1 hour, the threshold duration would be set at 3.6 hours, according to Equation (7).

3. Exemplary Embodiments

Figure 2:
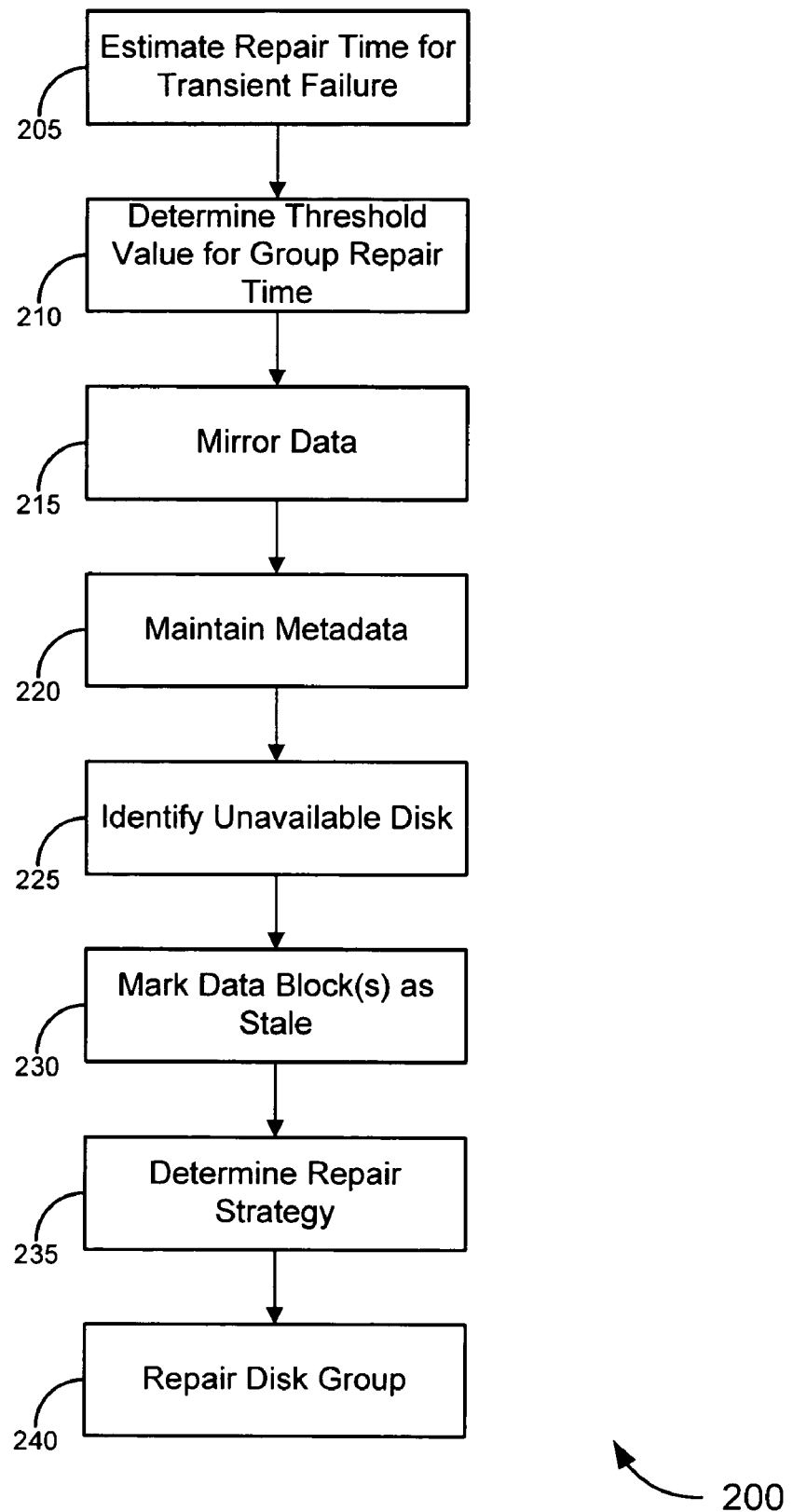
FIG. 2 is process flow diagram illustrating a method of repairing a disk group, in accordance with various embodiments of the invention.

As noted above, embodiments of the invention provide, inter alia, systems, methods and software for repairing a disk group in which one or more disks have failed. FIG. 2 illustrates a method 200 of repairing a disk group, in accordance with certain embodiments of the invention. It should be noted that, while the methods of the invention are not limited to any particular structural implementation, the method 200 of FIG. 2—like other methods of the invention—might be implemented within (and/or performed by) a computer system, including, merely by way of example, the computer systems 100, 500 and 600 illustrated by FIGS. 1, 5 and 6, respectively. In other embodiments, various procedures in the method 200 might be implemented as a set of instructions on a computer readable medium, such that the instructions can be executed by one or more computers to perform some or all of the method 200 (or other methods of the invention).

In many embodiments, the method 200 is performed in relation to a disk group (such as one of the disk groups 115*a* and 115*b*) comprising a plurality of hard disks. The method 200 can be used when one or more of the hard disks fails, although certain embodiments of the method 200 include preparatory procedures, which may be performed before a disk actually fails.

Merely by way of example, the method 200 might comprise estimating a mean repair time for a transient failure of a hard disk in the group (block 205). As noted above, a transient failure is any failure that can be fixed without requiring replacement of the disk itself or the entirety of the data on the disk. Examples of transient failures can include power loss, loss of connectivity, misconfiguration and/or the like. In many cases, the mean estimated repair time for a transient failure might be determined based on user experience, manufacturer documentation, and/or the like. Often, the mean estimated repair time will depend on system configuration as well as expected modes of failure—merely by way of example, if the disk group (or a particular disk) is located at a remote location from system administrators, travel time might be a factor in estimating a mean repair time. As another example, if redundant power supplies are used, loss of power might be discounted as a likely failure mode. Availability of common parts (power supplies, cables, etc.) expected to fail might also be a factor to be taken into consideration. In an aspect of some embodiments, the estimated mean repair time might also be based on an extrapolating data on past repair times (perhaps repair times for similar failures).

The method 200, in some cases, further comprises determining a threshold value for a repair time of the disk group (block 210). This threshold value specifies a duration in which a failure of one or more disks should be assumed to be transient. Hence, in accordance with some embodiments, as described in further detail below, a disk re-create operation will not be initiated until the duration specified by the threshold value has elapsed, since the assumption is that the disk failure might be transient, and if the disk failure is resolved, the expense of re-creating the disk need not be undertaken. The threshold value can be labeled in any appropriate increment, such as milliseconds, seconds, minutes, days, etc., to name but a few examples.

The threshold value can be determined in a variety of ways. Merely by way of example, in some embodiments, a user might be allowed (and/or prompted) to provide a threshold value. In other cases, the threshold value might be calculated by the system. In a particular set of embodiments, the threshold value might be calculated using the analytical model described above. Merely by way of example, in a typical embodiment, a user might provide an estimated mean repair time for a transient failure (perhaps using a wizard and/or other application that calculates an estimated mean repair time based on one or more factors, such as those described above, supplied by the user), and/or the system might calculate an optimal threshold value from that estimated mean repair time. In other embodiments, different procedures could be used to determine the threshold value.

As noted above, in accordance with some embodiments, data is mirrored (block 215) and/or data redundancy is otherwise provided. As described in more detail above, a variety of strategies (including hardware RAID, software RAID, application-based disk grouping, etc.) can be used to mirror data and/or provide data redundancy. In a particular embodiment, data on any particular disks is mirrored on one or more other disks. The mirroring can be performed at the extent (data block) level, such that no single disk mirrors the entire contents of any other disk, and/or at the disk level, such that all data on one disk is mirrored on one other disk. In a high-redundancy configuration, two complete copies of all of the data from one disk might be stored, one on each of two other disks). Any mirroring and/or data redundancy strategy can be used, so long as it allows extents on a failed disk to be re-created from redundant copies on one or more other disks in the disk group.

In accordance with another set of embodiments, metadata about the extents is maintained (block 230). Generally, although not always, the metadata about physical extents on disks in a group is maintained on disks within the group. Often, metadata redundancy might is provided, such that metadata about physical extents on a particular disk is stored (or mirrored) on one or more other disks, so that the metadata is available even if the disk fails. In a particular embodiment, redundancy of metadata is provided in the same fashion as redundancy of the data itself (e.g., double mirroring, triple mirroring, etc.). The metadata about a particular extent might comprise a variety of information about the extent, including without limitation, the last update of the extent, where mirrored copies of the extent are stored and/or the like. In a particular embodiment, as described above, the metadata about a particular physical extent will indicate whether that physical extent is current or stale (i.e., whether the last attempted write of the extent to the disk was successfully performed). Among other things, this metadata can be used, as described below, for example, to repair a failed disk.

When a disk fails, it is identified as unavailable (block 225). For purposes of this disclosure, a disk fails whenever it becomes unavailable for read operation and/or write operations. As noted above, in some cases, a disk failure is transient (i.e., can be recovered without physically replacing the disk and/or entirely rewriting its contents); in other cases, the disk failure might be permanent (e.g., a crashed head, spindle failure, etc.). One skilled in the art will appreciate, however, that at the time of failure, it often is not known whether a disk failure is permanent or transient. Hence, embodiments of the invention provide repair strategies that provide for either alternative.

Almost by definition, then, a failed disk cannot perform any write operations. Hence, if there are extents (data blocks) to be written to the disk, those write operations cannot be performed. Accordingly, in the metadata for each block that is to be written, the subject block is marked as stale (block 230). In this way, a record can be maintained of extents that were to be written while the disk was unavailable. (It should be noted that, in most cases, these write operations are not "lost." Instead, they are performed on the available copies of the relevant data blocks. Accordingly, these copies can be used to resync the disk if and when it becomes available, as described, for example, in FIG. 4, below.)

At block 235, a repair strategy for the failed disk is determined. In a particular set of embodiments, the repair strategy is determined, at least in part, by whether the disk becomes available before the duration specified by the threshold value expires. Merely by way of example, in some embodiments, the system will wait until either (i) the disk becomes available, or (ii) the duration specified by the threshold value expires, whichever happens first, to repair the disk.

If the failed disk does not become available before the threshold expires, a disk recreation operation (such as the process described below with respect to FIG. 3) might be selected as the chosen repair strategy. If the failed disk does become available again before the threshold expires, a disk resync operation (such as the process described below with respect to FIG. 4) might be selected as the chosen repair strategy. (Other strategies can be selected as well). The disk group is then repaired, using the selected repair strategy (block 240). In many cases, this will restore full redundancy to all data stored by the disk group.

Figure 3:
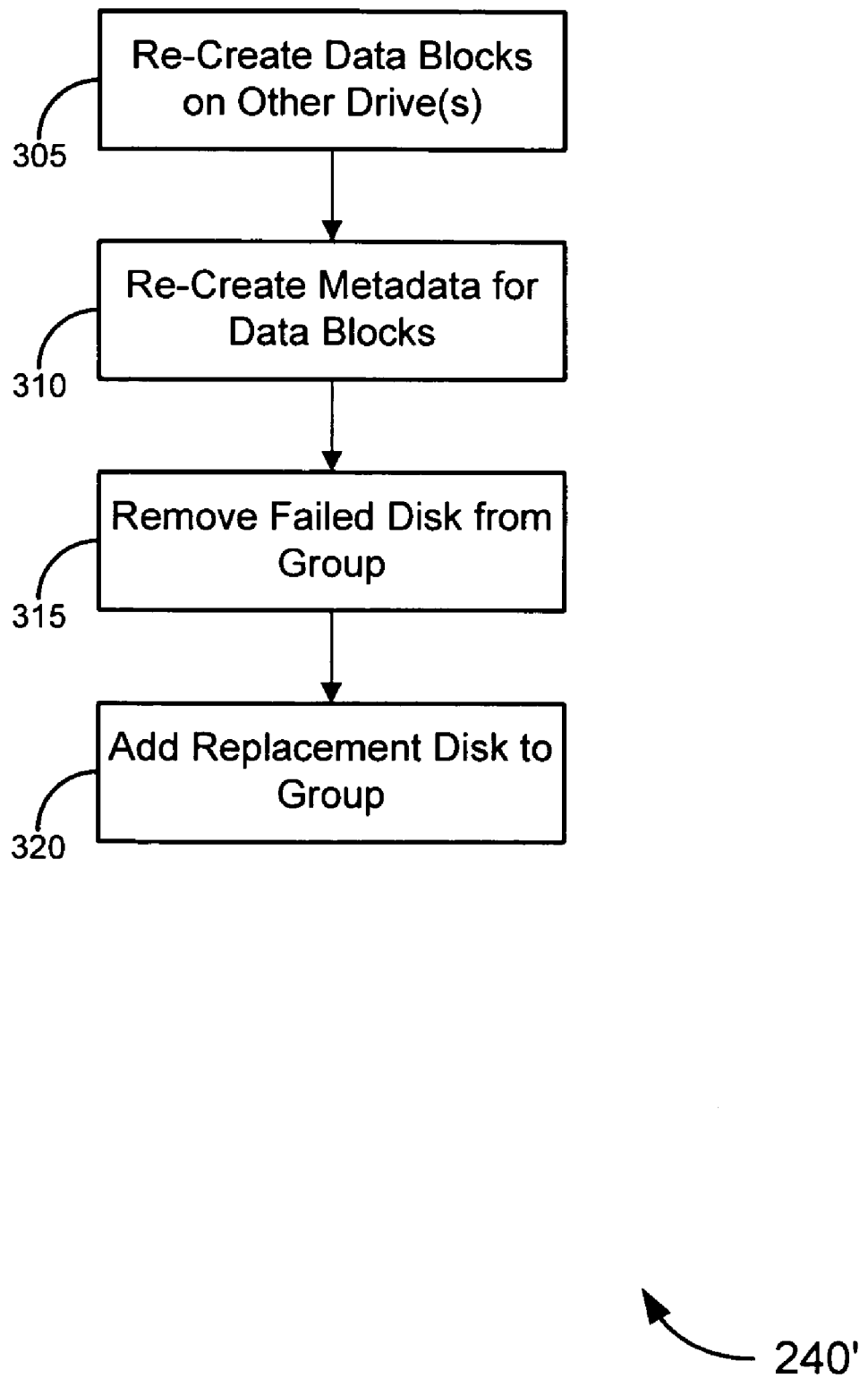
FIG. 3 is process flow diagram illustrating a method of re-creating a failed disk, in accordance with various embodiments of the invention.

FIG. 3 illustrates an exemplary disk recreation procedure 240' that can be used to repair a disk group. According to the disk recreation procedure 240', each data block on the failed disk is re-created on another disk in the group (block 305). (It should be noted that, in some cases, all of these blocks will be copied to a single other disk, essentially creating a replica of the failed disk, although this is not required. Hence, although the term "disk recreation" is used for convenience to describe this procedure, in many cases, it will not result in a strict recreation of the data from the failed disk on a single other disk; instead the contents of the failed disk might be distributed among a plurality of other disks in the group.) In a set of embodiments, the data blocks are recreated by copying each data block from its redundant copy stored (pursuant to a data mirroring or redundancy strategy) elsewhere in the disk group. At block 310, the metadata for each of the recreated blocks is also recreated.

Optionally, the failed disk can be (logically and/or physically) removed from the disk group (block 315). If desired, a replacement disk can be physically and/or logically added to the disk group (block 320). The procedures to drop and/or add disks to a disk group often depend on the implementation of the disk group and may vary according to the embodiment. Hence, detailed procedures for performing these operations are not discussed in detail herein but would be within the knowledge of one skilled in the art.

Figure 4:
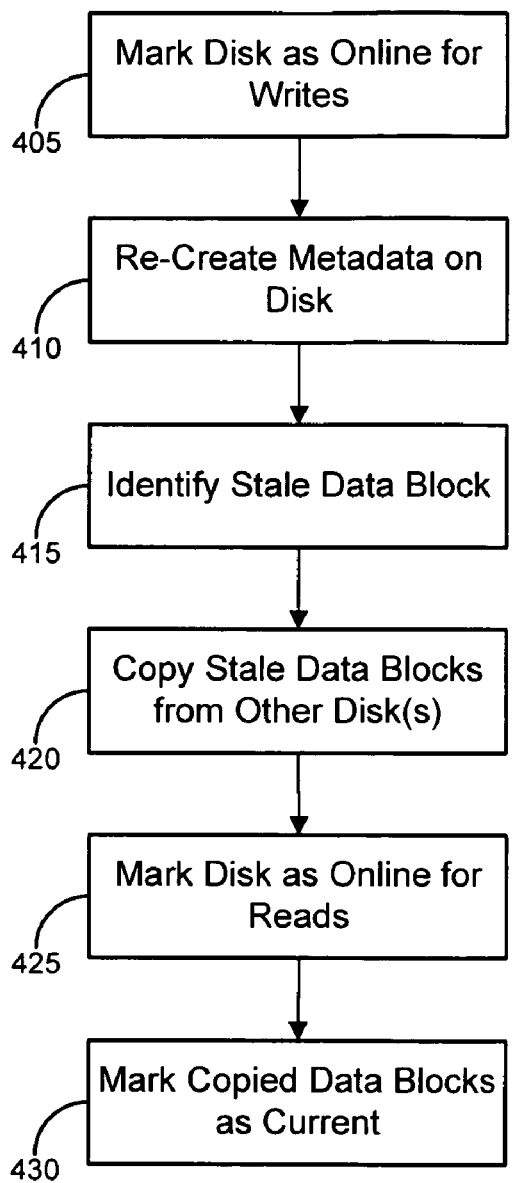
FIG. 4 is process flow diagram illustrating a method of resynchronizing a disk that has recovered from a transient failure, in accordance with various embodiments of the invention.

FIG. 4 illustrates an exemplary disk resync procedure 240" for repairing a disk group. The procedure 240" generally will be performed after a transient failure has been repaired and the disk has again become available to the disk group. At block 405, the disk is marked online for write operations (either manually or automatically by the disk grouping hardware and/or software). The metadata about the extents on the disk is then recreated (block 410), for example, by copying the metadata from redundant copies on one or more other disks. At block 415, stale data blocks (i.e., extents that were to have been written during the period in which the disk was unavailable) are identified (perhaps by searching the metadata for extents marked as stale), and at block 420, current copies of the stale data blocks are recreated (e.g., copied from current copies on other disks. The disk is then marked online for read operations (block 425), and the copied (previously stale) data blocks are marked as current in the metadata (block 430). At this point, all of the data on the previously-unavailable disk is current, and the disk can resume normal operations as part of the disk group.

Figure 5:
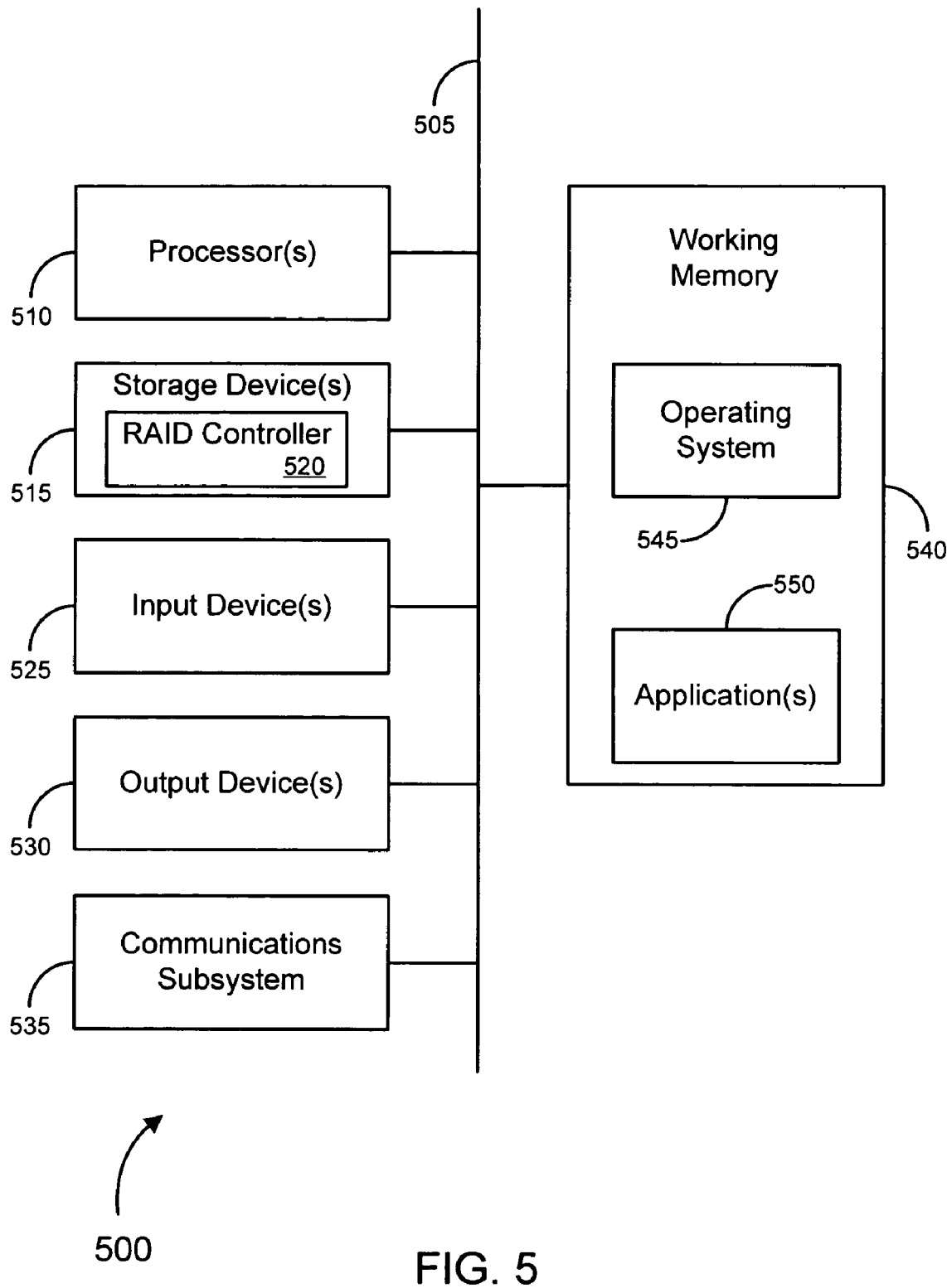
FIG. 5 is a generalized schematic diagram illustrating a computer system that can be used in accordance with various embodiments of the invention.

FIG. 5 provides a generalized schematic illustration of one embodiment of a computer system 500 that can perform the methods of the invention and/or the functions of computer, such as the computers described above. FIG. 5 is meant only to provide a generalized illustration of various components, any of which may be utilized as appropriate. The computer system 500 can include hardware components that can be coupled electrically via a bus 505, including one or more processors 510. In addition, one or more storage devices 515 might be coupled to the bus.

Such storage devices 515 can include without limitation a disk drive, an optical storage device, solid-state storage device such as a random access memory ("RAM") and/or a read-only memory ("ROM"), which can be programmable, flash-updateable and/or the like (and which can function as a data store). As noted above, in some embodiments, the storage devices 515 might comprise a storage system, including one or more disk groups that can be managed in accordance with embodiments of the invention. (The hard disks in such a group need not be physically enclosed within the computer system 500, but instead might be in communication with, and/or controlled by, the computer system). In some cases, also as noted above, a disk group might include one or more RAID systems, and the computer system 500 might include a RAID controller 520 that is operable to configure and/or manage such RAID systems, for instance, to implement methods of the invention.

Also in communication with the bus 505 can be one or more input devices 525, which can include without limitation a mouse, a keyboard and/or the like; one or more output devices 530, which can include without limitation a display device, a printer and/or the like; and a communications subsystem 535; which can include without limitation a modem, a network card (wireless or wired), an infra-red communication device, and/or the like).

The computer system 500 also can comprise software elements, shown as being currently located within a working memory 540 (but which could also more permanently be stored on one or more of the storage devices 515 and/or other computer readable media). The software elements generally will include one or more sets of instructions that are executable by the computer system 505. Specifically, the software elements can including, without limitation, an operating system 540 and/or other code 545, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

Figure 6:
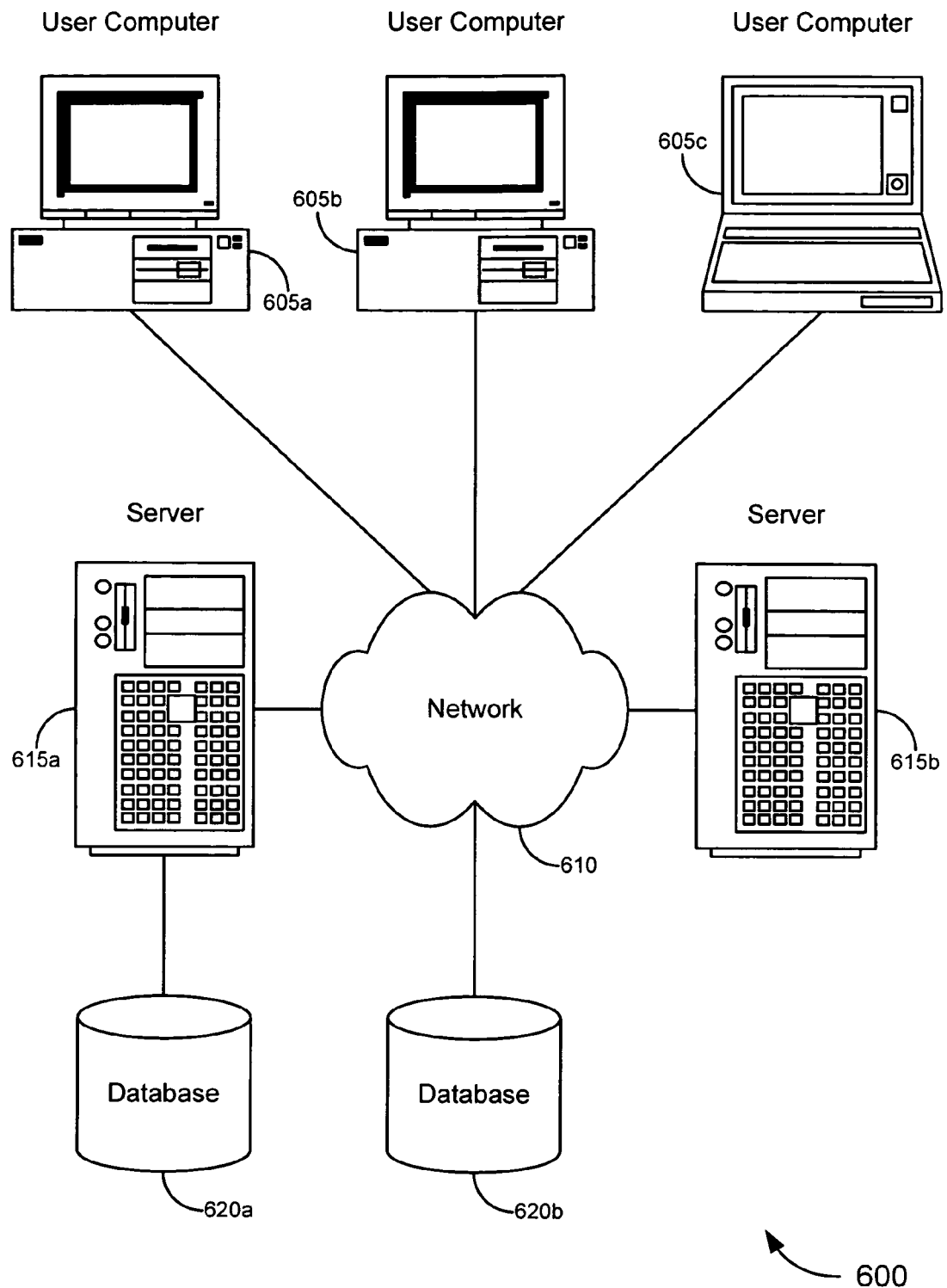
FIG. 6 is a block diagram of a networked computer system that can be used in accordance with various embodiments of the invention.

As noted above, a set of embodiments comprises systems for repairing a disk group. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant, capable of communicating via a network (e.g., the network 610 described below) and/or displaying and navigating web pages or other types of electronic documents. Although the exemplary system 600 is shown with three user computers, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system including without limitation any of those discussed above, as well as any commercially-available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one ore more file and or/application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 605 and/or another server 615. In some embodiments, an application server can create web pages dynamically for displaying information about disk groups and/or for initiating and/or performing disk group configuration and/or repair operations. Data provided by an application server may be formatted as web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server.

In accordance with further embodiments, one or more servers 615 can function as a file server and/or can include one or more of the files necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as it can be in communication (e.g., via the network 610) with one or more of these. In a particular set of embodiments, a database 620 can reside in a storage-area network ("SAN") familiar to those skilled in the art. The SAN might be implemented as a disk group in accordance with embodiments of the invention. (Likewise, any necessary files for performing the functions attributed to the computers 605, 615 can be stored locally on the respective computer and/or remotely, as appropriate.) In one set of embodiments, the database 635 can be a relational database, such as an Oracle database, that is adapted to store, update, and retrieve data in response to SQL-formatted commands. The database might be controlled and/or maintained by a database server, as described above, for example. In particular embodiments, the database server might be configured with DBMS software and/or Automated Storage Management™ software, which can be used to create, configure and/or repair disk groups in accordance with embodiments of the invention.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of repairing a disk group comprising a plurality of disks, the method comprising:
    determining a threshold value for a repair time of the disk group, wherein the threshold value represents a duration during which a hard disk failure should be assumed to be transient;
    maintaining a set of metadata for each hard disk in the disk group, wherein each hard disk stores a set of data blocks, each data block comprising a set of data stored on the hard disk, and wherein the set of metadata for a hard disk comprises information about whether each of the data blocks on the hard disk is current;
    identifying with a computer a first hard disk in the disk group that has become unavailable, wherein the first hard disk comprises a first set of data blocks;
    marking as stale, in the set of metadata for the first hard disk, each data block on the first hard disk to which a write attempt is made while the offline disk is unavailable; and
    repairing the disk group, wherein repairing the disk group comprises:
        (i) re-creating each of the data blocks marked as stale in the metadata for the first hard disk, if the first hard disk becomes available before the duration specified by the threshold value has expired; and
        (ii) re-creating the first set of data blocks on one or more additional hard disks in the disk group, if the first hard disk does not become available before the duration specified by the threshold value has expired.

2. A method as recited in claim 1, wherein determining the threshold value comprises:
    estimating a mean repair time for a transient failure of a hard disk in the disk group; and
    calculating the threshold value based on the estimated mean repair time.

3. A method as recited in claim 2, wherein calculating the threshold value comprises multiplying the estimated mean repair time by a value based on one or more factors selected from the group consisting of:
    a probability that a failure of the first hard disk is transient;
    an expected duration required to re-create each of the data blocks marked as stale;
    an expected duration required to re-create the first set of data blocks on the one or more additional hard disks.

4. A method as recited by claim 3, wherein the threshold value is calculated from the following formula:

$$t_{opt} = \bar{t} \ln \frac{p_t(t_d - t_r - \bar{t})}{(1 - p_t)\bar{t}}$$

wherein $t_{opt}$ is the threshold value, $\bar{t}$ is the mean repair time for a transient failure, $t_r$ is the expected duration required to re-create each of the data blocks marked as stale, $t_d$ is the expected duration required to re-create the first set of data blocks on the one or more additional hard disks, and $p_t$ is the probability that the failure of the first hard disk is transient.

5. A method as recited by claim 1, wherein determining the threshold value comprises allowing a user to specify the threshold value.

6. A method as recited by claim 1, wherein identifying the first hard disk as unavailable comprises marking the first hard disk as offline.

7. A method as recited by claim 1, further comprising mirroring each of the data blocks in the first set of data blocks on one or more other hard disks in the disk group.

8. A method as recited by claim 7, wherein re-creating a data block comprises copying the data block from a mirrored copy on another hard disk in the disk group.

9. A method as recited by claim 1, wherein (ii) further comprises removing the first hard disk from the disk group.

10. A method as recited by claim 1, wherein (i) comprises:
marking the first hard disk online for write operations;
re-creating on the first hard disk the set of metadata for the first hard disk;
copying to the first hard disk, and from one or more other hard disks in the disk group, each of the data blocks marked as stale in the metadata for the first hard disk;
marking the first hard disk as online for read operations; and
marking as current, in the metadata for the first hard disk, all of the copied data blocks.

11. A system for repairing a disk group, the system comprising:
a processor; and
a computer readable medium comprising a set of instructions executable by the processor, the set of instructions comprising:
(a) instructions to determine a threshold value for a repair time of the disk group, wherein the threshold value represents a duration during which a hard disk failure should be assumed to be transient;
(b) instructions to maintain a set of metadata for each hard disk in the disk group, wherein each hard disk stores a set of data blocks, each data block comprising a set of data stored on the hard disk, and wherein the set of metadata for a hard disk comprises information about whether each of the data blocks on the hard disk is current;
(c) instructions to identify a first hard disk in the disk group that has become unavailable, wherein the first hard disk comprises a first set of data blocks;
(d) instructions to mark as stale, in the set of metadata for the first hard disk, each data block on the first hard disk to which a write attempt is made while the offline disk is unavailable; and
(e) instructions to repair the disk group, wherein the instructions to repair the disk group comprise:
(i) instructions to re-create each of the data blocks marked as stale in the metadata for the first hard disk, if the first hard disk becomes available before the duration specified by the threshold value has expired; and
(ii) instructions to re-create the first set of data blocks on one or more additional hard disks in the disk group, if the first hard disk does not become available before the duration specified by the threshold value has expired.

12. A system, comprising:
a processor;
a disk group comprising a plurality of hard disks, each of the plurality of hard disks being in communication with the processor; and
a computer readable medium comprising a set of instructions executable by the processor, the set of instructions comprising:
(a) instructions to determine a threshold value for a repair time of the disk group, wherein the threshold value represents a duration during which a hard disk failure should be assumed to be transient;
(b) instructions to maintain a set of metadata for each hard disk in the disk group, wherein each hard disk stores a set of data blocks, each data block comprising a set of data stored on the hard disk, and wherein the set of metadata for a hard disk comprises information about whether each of the data blocks on the hard disk is current;
(c) instructions to identify a first hard disk in the disk group that has become unavailable, wherein the first hard disk comprises a first set of data blocks;
(d) instructions to mark as stale, in the set of metadata for the first hard disk, each data block on the first hard disk to which a write attempt is made while the offline disk is unavailable; and
(e) instructions to repair the disk group, wherein the instructions to repair the disk group comprise:
(i) instructions to re-create each of the data blocks marked as stale in the metadata for the first hard disk, if the first hard disk becomes available before the duration specified by the threshold value has expired; and
(ii) instructions to re-create the first set of data blocks on one or more additional hard disks in the disk group, if the first hard disk does not become available before the duration specified by the threshold value has expired.

13. A system as recited by claim 12, wherein the disk group comprises a redundant array of independent disks ("RAID").

14. A system as recited by claim 12, wherein the set of metadata about each hard disk in the disk group is distributed across two or more of the hard disks, allowing the set of metadata for the first hard disk to be re-created from information on one or more other hard disks.

15. A computer program, embodied on a computer readable medium, for repairing a disk group comprising a plurality of hard disks, the computer program comprising a set of instructions executable by one or more computers, the set of instructions comprising:
instructions to determine a threshold value for a repair time of the disk group, wherein the threshold value represents a duration during which a hard disk failure should be assumed to be transient;
instructions to maintain a set of metadata for each hard disk in the disk group, wherein each hard disk stores a set of data blocks, each data block comprising a set of data stored on the hard disk, and wherein the set of metadata for a hard disk comprises information about whether each of the data blocks on the hard disk is current;
instructions to identify a first hard disk in the disk group that has become unavailable, wherein the first hard disk comprises a first set of data blocks;
instructions to mark as stale, in the set of metadata for the first hard disk, each data block on the first hard disk to which a write attempt is made while the offline disk is unavailable; and
instructions to repair the disk group, wherein the instructions to repair the disk group comprise:
(i) instructions to re-create each of the data blocks marked as stale in the metadata for the first hard disk, if the first hard disk becomes available before the duration specified by the threshold value has expired; and (ii) instructions to re-create the first set of data blocks on one or more additional hard disks in the disk group, if the first hard disk does not become available before the duration specified by the threshold value has expired.

16. A system for repairing a disk group comprising a plurality of hard disks, the system comprising:

means for determining a threshold value for a repair time of the disk group, wherein the threshold value represents a duration during which a hard disk failure should be assumed to be transient;

means for maintaining a set of metadata for each hard disk in the disk group, wherein each hard disk stores a set of data blocks, each data block comprising a set of data stored on the hard disk, and wherein the set of metadata for a hard disk comprises information about whether each of the data blocks on the hard disk is current;

means for identifying a first hard disk in the disk group that has become unavailable, wherein the particular hard disk comprises a first set of data blocks;

means for marking as stale, in the set of metadata for the first hard disk, each data block on the first hard disk to which a write attempt is made while the offline disk is unavailable; and means for repairing the disk group, wherein the means for repairing the disk group comprises:

(i) means for re-creating each of the data blocks marked as stale in the metadata for the first hard disk, if the first hard disk becomes available before the duration specified by the threshold value has expired; and (ii) means for re-creating the first set of data blocks on one or more additional hard disks in the disk group, if the first hard disk does not become available before the duration specified by the threshold value has expired.

* * * * *

UNITED STATES PATENT AND TRADEMARK OFFICE
CERTIFICATE OF CORRECTION

PATENT NO. : 7,565,575 B2
APPLICATION NO. : 11/516068
DATED : July 21, 2009
INVENTOR(S) : Radek Vingralek It is certified that error appears in the above-identified patent and that said Letters Patent is hereby corrected as shown below:

In column 1, line 11, delete "Vingrelek" and insert -- Vingralek --, therefor.

In column 1, line 17, delete "Vingrelek" and insert -- Vingralek --, therefor.

Signed and Sealed this

Thirteenth Day of July, 2010

David J. Kappos
*Director of the United States Patent and Trademark Office*